United States Patent [19]

Miescher

[11] 3,961,680

[45] June 8, 1976

[54] AUTOMOBILE SECURITY DEVICE

[76] Inventor: Marcel Miescher, 9 rue du Vieux-Billard, Geneva, Switzerland

[22] Filed: Sept. 30, 1974

[21] Appl. No.: 510,721

[30] Foreign Application Priority Data

Sept. 28, 1973 Switzerland.................... 13984/73

[52] U.S. Cl............................. 180/82 C; 280/744; 307/10 SB
[51] Int. Cl.²....................................... B60R 21/10
[58] Field of Search............... 180/82 C, 82 R, 103, 180/99; 307/105 B; 297/385; 340/279; 280/150 SB

[56] References Cited
UNITED STATES PATENTS

| | | | |
|---|---|---|---|
| 2,711,528 | 6/1955 | Glossbrenner | 340/279 |
| 2,868,309 | 1/1959 | Burgess | 180/82 C |
| 3,146,027 | 8/1964 | Winberg | 297/385 |
| 3,154,168 | 10/1964 | Wilmot | 180/103 |
| 3,215,220 | 11/1965 | Schoeffler | 180/82 C |
| 3,241,205 | 3/1966 | Genin | 297/385 X |
| 3,281,818 | 10/1966 | Morgan et al. | 180/103 X |
| 3,610,361 | 10/1971 | Pringle | 180/82 C |
| 3,630,288 | 12/1971 | Tiberti | 169/62 X |
| 3,638,647 | 2/1972 | Creelman | 340/279 X |
| 3,670,320 | 6/1972 | Palmer | 340/279 |

*Primary Examiner*—M. H. Wood, Jr.
*Assistant Examiner*—John P. Silverstrim
*Attorney, Agent, or Firm*—Bacon & Thomas

[57] ABSTRACT

An automobile vehicle seat safety belt has a security release device including a member releasably connected to an attachment on an end of the belt, the member being mounted in a fixed casing for spring opposed movement in response to traction in the belt when the member is moved by a traction in the belt exceeding a given value, e.g. upon an impact of the vehicle, contacts carried by the member actuate breaking of the vehicle's ignition circuit and, after a given delay, release of the attachment from the member whereby the occupant can free himself or be freed from the belt without having to open the conventional buckle.

4 Claims, 3 Drawing Figures

AUTOMOBILE SECURITY DEVICE

The invention relates to security devices for automobile vehicles provided with at least one safety belt, in particular to avoid that the passengers of a vehicle involved in an accident and who are unable to open their safety belts will remain emprisoned in the vehicle and risk being incinerated.

According to the invention, such a security device comprises: a first member subjected to the traction of the belt and movable in response to traction exerted on the belt; a second control member actuated by movement of said first member in response to a traction on the belt exceeding a given value; and security means controlled by said control member.

The accompanying drawings show, by way of example, an embodiment of the invention particularly intended to enable the driver or other passenger of an automobile wearing a seat safety belt to be able to leave the vehicle, or be pulled out of the vehicle, after an accident and without having to open the safety belt.

Figure 1:
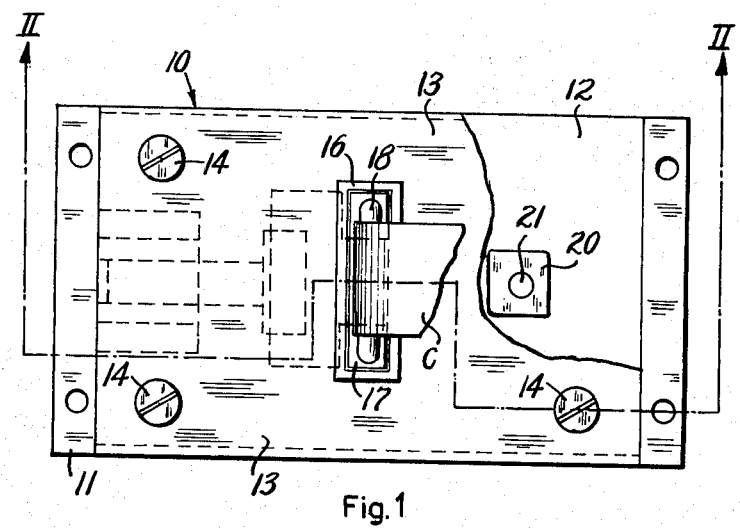
FIG. 1 is a plan vieuw of a casing enclosing the mechanical components of the device.

The device shown comprises a mechanism (FIGS. 1 and 2) housed in a casing 10 embedded in the floor of the vehicle and by means of which a seat safety belt C is anchored to the floor.

The housing includes a base plate 11 secured to the floor of the vehicle body and a top plate 13 fixed on the base plate 11 by side walls. The mechanism includes a plate 12 movably mounted in the casing along four screws 14 held on plate 13, each screw 14 having a compression spring 15 briasing the plate 12 to oppose upward movement thereof.

A tubular piece 16, of rectangular cross-section, is fixed in an opening in plate 12, and is slidably received in a rectangular opening in plate 13. This piece 16 has a rectangular passageway which can slidably receive a rectangular attachment piece 17 secured at an upper end there of to a lower end of belt C by a loop 18.

A catch 19 is pivotably connected to the other, lower end of piece 17. Two contacts 20 are mounted on the upper face of plate 12, each contact 20 having a mobile press-button 21 normally spaced apart from the plate 13 by a certain distance, but which can be brought to touch the plate 13 and actuate the respective contact 20 when the plate 12 is raised with a compression of springs 15 by a certain amount.

Figure 2:
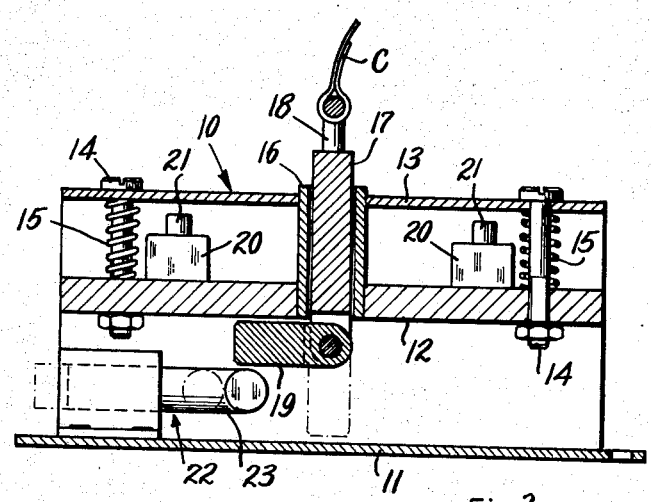
FIG. 2 is a cross-section taken along line II—II of FIG. 1.

The catch 19 normally occupies the position shown in full lines in FIG. 2, in which it is locked by an electromagnetic lock 22 including a latch 23, and in which the belt C and attachment piece 17 are locked to the plate 12. Consequently when a traction is exerted in the belt C, the plate 12 is lifted up against the action of springs 15. The latch 23 remains in its locking position as long as the coil of its electromagnet is de-energized. When this coil is energized, the latch 23 which is integral with the core of the electromagnet moves towards the left (FIGS. 1,2) hence freeing the catch 19. When this catch is freed, the belt C and piece 17 are no longer locked to the plate 12.

A slight traction in the belt C suffices to pull the attachment piece 17 out of the tubular piece 16, the catch 19 pivoting to a vertical position, shown in dot-dash lines, FIG. 2, whereby it can also pass through and out of tubular piece 16.

Figure 3:
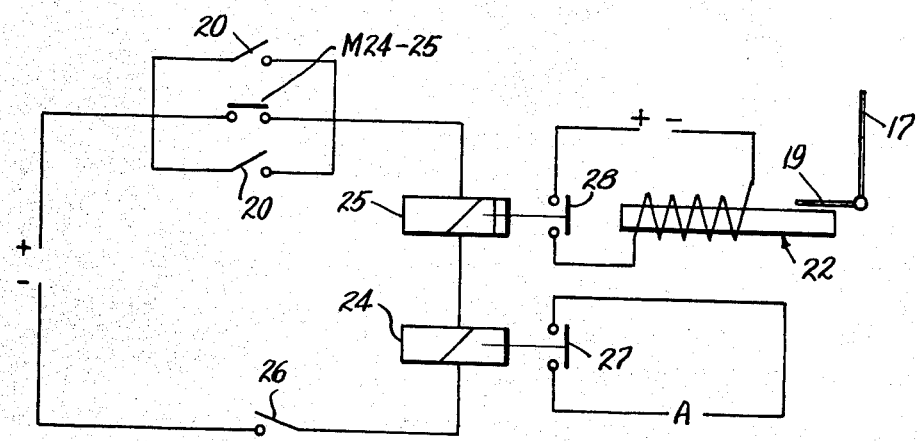
FIG. 3 is a circuit diagram of an electric circuit of the device.

The device also comprises an electric circuit shown in the diagram of FIG. 3; this circuit may be lodged either in the casing 10, or outside the casing. Apart from contacts 20 and the electromagnetic lock 22 mentioned above, the circuit includes a relay 24, a time-delay relay 25 and a main switch 26.

Relays 25 and 26 are connected in series in a loop supplied by the vehicle's battery and controlled by contacts 20, in parallel, and switch 26.

The relay 24 has a maintenance or holding circuit (contact M 24) and a contact 27 connected in the vehicle's ignition circuit A.

The relay 25 has a maintenance or holding circuit (contact M 25) and a contact 28 connected in the energization circuit of the coil of electromagnetic lock 22.

Operation of the device is a follows:

The lower end of belt C is initially locked in the casing with the latch 23 and catch 19 in their locked positions as shown in FIGS. 1 and 2.

A traction exerted in belt C following an impact of the vehicle causes raising of plate 12 and closing of contacts 20. This generates a pulse in relays 24 and 25 and places their holding circuits under voltage; contact 27 opens immediately whereas contact 28 is closed after a certain delay, of the order of several seconds.

In these conditions, the ignition circuit A is broken, which eliminates the risk of fire as a result of a short-circuit, and the lower end of belt C is freed several seconds after the impact. Hence, after the seat safety belt has carried out its retaining action during the impact, the person wearing the belt can free himself and leave the vehicle, even if he is semi-concious or grogged, without having to open the belt buckle. Likewise an injured occupant can be pulled out of the vehicle without the need to open the belt buckle.

The invention is not limited to the embodiment shown in the drawings.

In particular, the safety belts of several passengers could be connected to a single mechanism. In this case, several attachment pieces 17 would be disposed in parallel, side by side, and each attached to a different belt, so that all of the belts will be simultaneously feed, thereby avoiding a risk of obstructing the freeing and removal of the occupants.

Also, the control of other security means or means for protecting the driver and passengers could be provided.

For example, fire extinguishing means or means for alerting or warning a driver who leans over, for example upon falling asleep, by actuating an acoustic signal as soon as his body exerts on the belt a traction exceeding a given limit.

What is claimed is:

1. In an automobile vehicle provided with at least one safety belt, a security device comprising:
    a. an attachment piece secured to an end of the belt, said attachment piece having a pivotally movable catch thereon;
    b. a casing fixed in the vehicle, said casing including means defining an opening removably receiving said attachment piece and said pivotally movable catch;
    c. a member movably mounted in said casing;

d. spring means opposing said movement of the member;
e. means for normally holding said catch in a fixed position, relative to said member, to lock said attachment piece in said casing; and means for releasing said holding means in response to movement of said member by an amount corresponding to a given traction in the belt and after a given delay whereby said catch may pivot on said attachment piece for withdrawal thereof through said opening.

2. A device according to claim 1, said holding means comprising an electromagnetic bolt and said releasing means comprising a relay controlling said bolt and a switch, actuated by said movement of said member to control said relay.

3. A device according to claim 1, in which said security device include a switch for breaking an ignition circuit of the vehicle in response to said movement of said member.

4. A device according to claim 1, in which said means for releasing includes a switch in an electric circuit controlling said security device.

* * * * *

UNITED STATES PATENT OFFICE
CERTIFICATE OF CORRECTION

Patent No. 3,961,680　　　　　　　　Dated June 8, 1976

Inventor(s) Marcel Miescher

It is certified that error appears in the above-identified patent and that said Letters Patent are hereby corrected as shown below:

For "[21] Appl. No.:510,721", read

-- [21] Appl. No.:510,724 --.

Signed and Sealed this

Twenty-second Day of February 1977

[SEAL]

Attest:

RUTH C. MASON
*Attesting Officer*

C. MARSHALL DANN
*Commissioner of Patents and Trademarks*